(12) United States Patent
Lin et al.

(10) Patent No.: US 12,522,091 B2
(45) Date of Patent: Jan. 13, 2026

(54) ELECTRIC VEHICLE CHARGING GUN

(71) Applicant: Luxshare Precision Industry (Jiangsu)Co., Ltd., Liyang (CN)

(72) Inventors: Peiquan Lin, Liyang (CN); Xiangfeng Shen, Liyang (CN); Yunbo Linghu, Liyang (CN); Xingran Tang, Liyang (CN)

(73) Assignee: LUXSHARE PRECISION INDUSTRY (JIANGSU) CO., LTD., Jiangsu (CN)

( * ) Notice: Subject to any disclaimer, the term of this patent is extended or adjusted under 35 U.S.C. 154(b) by 643 days.

(21) Appl. No.: 18/090,728

(22) Filed: Dec. 29, 2022

(65) Prior Publication Data

US 2024/0083270 A1    Mar. 14, 2024

(30) Foreign Application Priority Data

Sep. 14, 2022   (CN) .......................... 202211113877.2

(51) Int. Cl.
| | | |
|---|---|---|
| *B60L 53/16* | (2019.01) | |
| *B60L 53/18* | (2019.01) | |
| *H01R 13/15* | (2006.01) | |
| *H01R 13/52* | (2006.01) | |
| *H01R 13/629* | (2006.01) | |

(52) U.S. Cl.
CPC ............. *B60L 53/16* (2019.02); *B60L 53/18* (2019.02); *H01R 13/15* (2013.01); *H01R 13/5205* (2013.01); *H01R 13/629* (2013.01)

(58) Field of Classification Search
CPC ......... B60L 53/16; B60L 53/18; H01R 13/15; H01R 13/5205; H01R 13/629; H01R 13/639; H01R 13/701; H01R 13/6275; H01R 13/502; H01R 13/70
See application file for complete search history.

(56) References Cited

U.S. PATENT DOCUMENTS

| | | | |
|---|---|---|---|
| 5,536,173 | A | 7/1996 | Fujitani et al. |
| 2012/0088382 | A1 | 4/2012 | Konchan |
| 2022/0194237 | A1 | 6/2022 | Zhu et al. |

FOREIGN PATENT DOCUMENTS

| | | |
|---|---|---|
| CN | 105826762 A | 8/2016 |
| CN | 105846246 A | 8/2016 |
| CN | 205429332 U | 8/2016 |
| CN | 106114274 A | 11/2016 |

(Continued)

*Primary Examiner* — David V Henze-Gongola
(74) *Attorney, Agent, or Firm* — Birch, Stewart, Kolasch & Birch, LLP (57) ABSTRACT

Disclosed is an electric vehicle charging gun, including: a housing, an elastic connector, first cables, and a locking module detachably electrically connected to the elastic connector. The housing is provided with a first cavity where the locking module is disposed, a second cavity where the first cables are disposed, and a first opening which connects the first cavity and the second cavity and where the elastic connector is disposed. The first cables are connected to the elastic connector and a power supply unit. The locking module includes a control switch and an electronic lock integrated together. The control switch controls the electronic lock to lock the electric vehicle charging gun. The electronic lock transmits a feedback signal to the power supply unit through the elastic connector and the first cables, and receives an unlock signal from the power supply unit to unlock the electric vehicle charging gun.

10 Claims, 8 Drawing Sheets

(56) References Cited

FOREIGN PATENT DOCUMENTS

| | | |
|---|---|---|
| CN | 205871776 U | 1/2017 |
| CN | 208336679 U | 1/2019 |
| CN | 109346878 A | 2/2019 |
| CN | 109428194 A | 3/2019 |
| CN | 110277676 A | 9/2019 |
| CN | 111786178 A | 10/2020 |
| CN | 215645341 A | 1/2022 |
| TW | M539178 U | 4/2017 |

ELECTRIC VEHICLE CHARGING GUN

CROSS REFERENCE TO RELATED PRESENT DISCLOSURE

This application claims the priority benefit of Chinese Patent Application Serial Number 202211113877.2, filed on Sep. 14, 2022, the full disclosure of which is incorporated herein by reference.

BACKGROUND

Technical Field

The present disclosure relates to the technical field of charging guns, and in particular, to an electric vehicle charging gun.

Related Art

With the rise of awareness of environmental protection in countries around the world, the electric vehicle industry is developing rapidly, wherein the electric vehicle charging gun is a very important component.

At present, when the electric vehicle charging gun is plugged into the electric vehicle charging seat, the existing electric vehicle charging gun usually utilizes a control switch to drive the electronic lock to structurally lock the mechanical lock to avoid hot plugging during the charging process, which provides a guarantee for the safe use of the electric vehicle charging gun. When the charging process is completed (that is, the electric vehicle charging gun is powered off), the electronic lock is reset to unlock the mechanical lock, and the user can perform unlock operation. Therefore, the electronic lock and the control switch become the most easily damaged components in the actual use of the electric vehicle charging gun. However, the installation design of the electronic lock and the control switch in the existing electric vehicle charging gun has the problems of complex structure, inconvenient installation, low assembly efficiency, and high maintenance cost.

Therefore, how to provide a solution that solves the above-mentioned technical problem is the problem that those skilled in the art need to solve at present.

SUMMARY

The embodiments of the present disclosure provide an electric vehicle charging gun, which can solve the problems of complex structure, inconvenient installation, low assembly efficiency, and high maintenance cost in the installation design of the electronic lock and the control switch in existing electric vehicle charging gun.

In order to solve above-mentioned technical problem, the present disclosure is implemented as follows.

The present disclosure provides an electric vehicle charging gun, which includes: a housing, an elastic connector, a plurality of first cables and a locking module. The housing is provided with a first cavity, a second cavity and a first opening connecting the first cavity and the second cavity. The elastic connector is disposed in the first opening. The plurality of first cables is disposed in the second cavity, one end of each first cable is connected to the elastic connector, and the other end of each first cable is connected to a power supply unit. The locking module is disposed in the first cavity and is detachably electrically connected to the elastic connector. The locking module includes a control switch and an electronic lock electrically connected to each other, and the control switch and the electronic lock are integrated together. The control switch is configured to control the electronic lock to perform a locking action to lock the electric vehicle charging gun. The electronic lock transmits a feedback signal to the power supply unit through the elastic connector and the plurality of first cables, receives an unlock signal from the power supply unit, and performs an unlocking action to unlock the electric vehicle charging gun based on the unlock signal.

In the electric vehicle charging gun of the embodiments of the present disclosure, by the design that the elastic connector is disposed in the first opening, the control switch and the electronic lock are integrated into the locking module, the locking module is disposed in the first cavity on the top of the housing, and the locking module is detachably electrically connected to the elastic connector, the assembly process is reduced, and the electronic lock and the elastic connector are rapidly contacted; the electronic lock and the control switch can be replaced quickly, the maintenance cost is reduced and the maintenance efficiency is improved when the electronic lock and/or control switch are/is abnormal.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The following embodiments describe the features and advantages of the present disclosure in detail, but do not limit the scope of the present disclosure in any point of view. According to the description, claims, and drawings, a person ordinarily skilled in the art can easily understand the technical content of the present disclosure and implement it accordingly.

The embodiments of the present disclosure will be described below in conjunction with the relevant drawings. In the figures, the same reference numbers refer to the same or similar components or method flows.

It must be understood that the words "including", "comprising" and the like used in this specification are used to indicate the existence of specific technical features, values, method steps, work processes, elements and/or components. However, it does not exclude that more technical features, values, method steps, work processes, elements, components, or any combination of the above can be added.

It must be understood that when an element is described as being "connected" or "coupled" to another element, it may be directly connected or coupled to another element, and intermediate elements therebetween may be present. In contrast, when an element is described as being "directly connected" or "directly coupled" to another element, there is no intervening element therebetween.

In addition, although the terms such as "first", "second", etc., are used herein to describe different elements or operations, these terms are only used to distinguish elements or operations described with the same technical terms.

Figure 1:
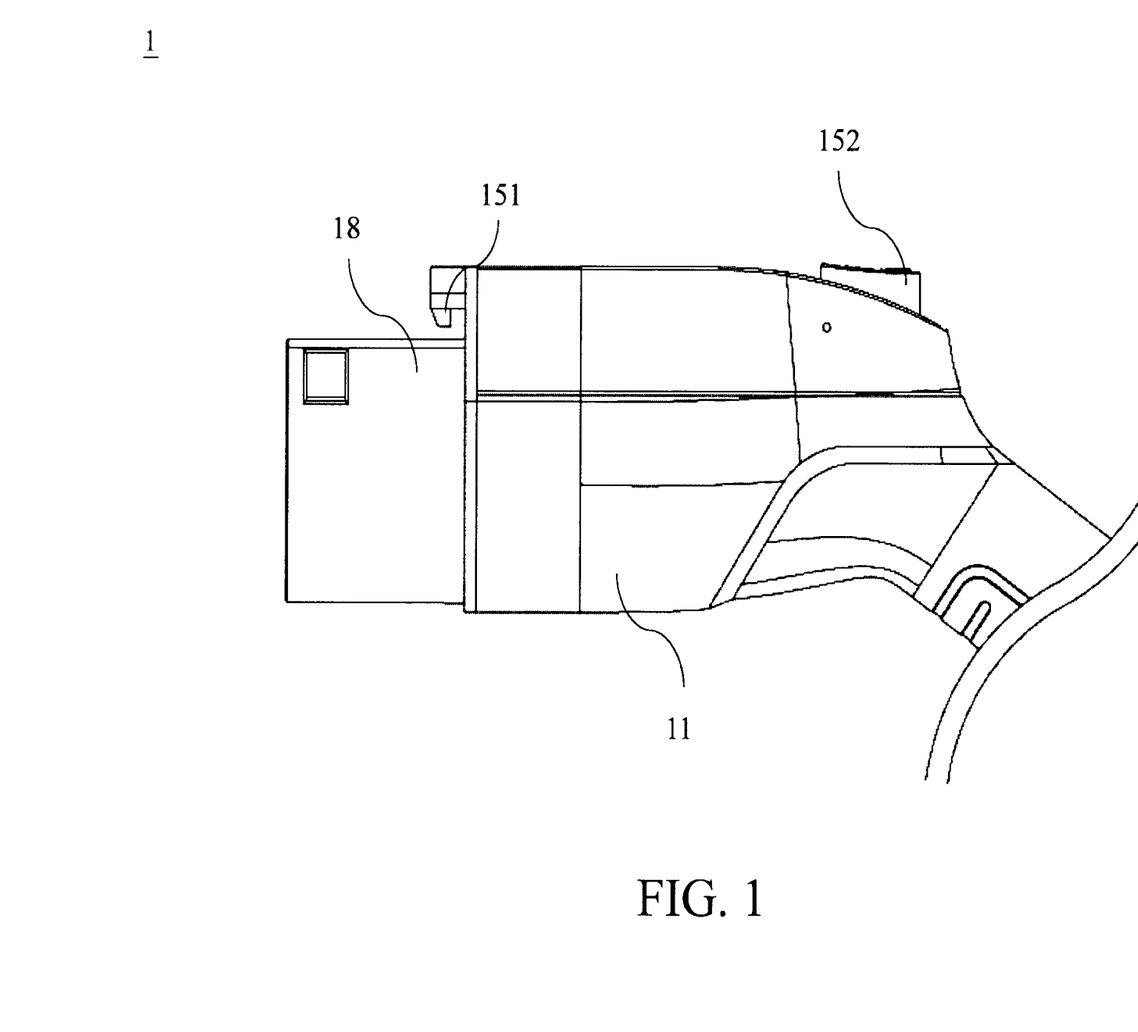
FIG. 1 is a schematic structural view of an electric vehicle charging gun according to an embodiment of the present disclosure.
Figure 2:
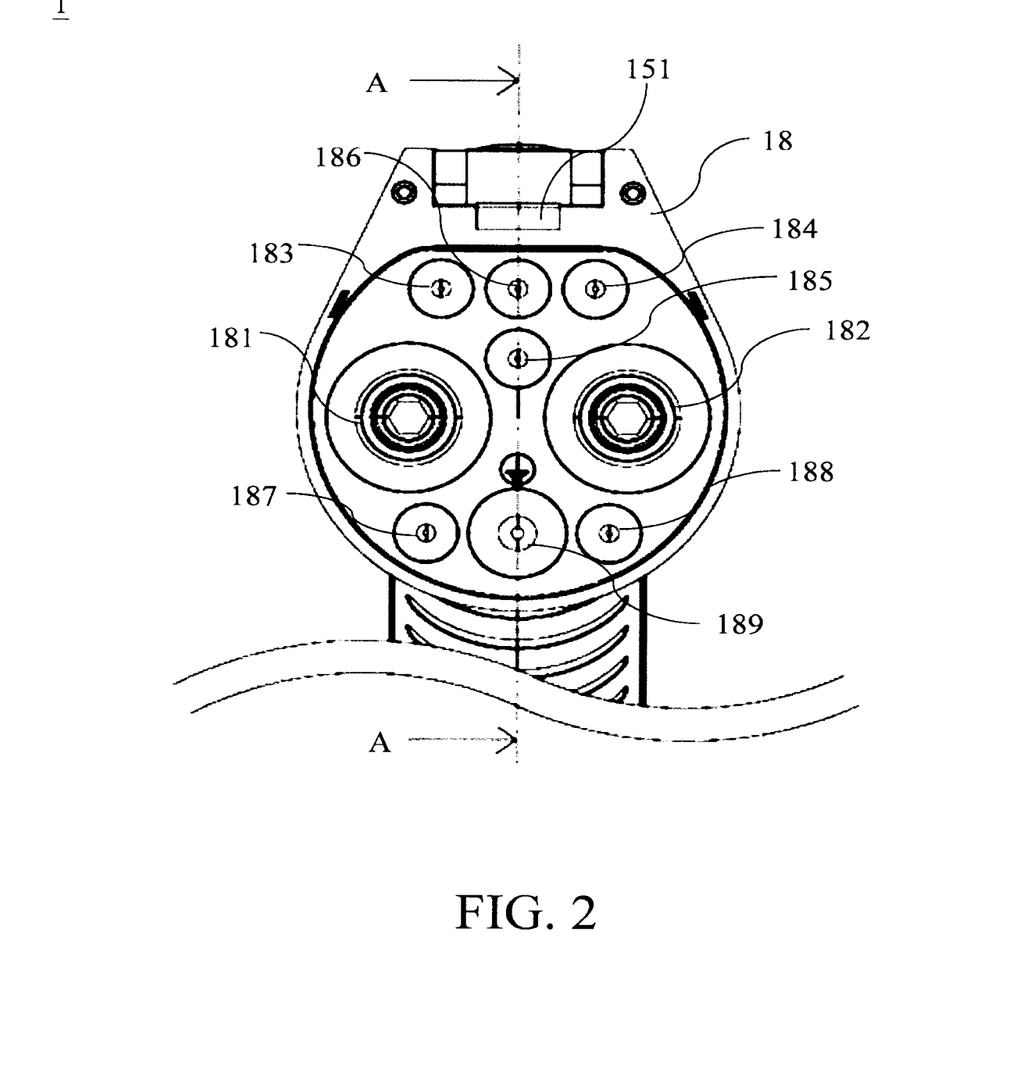
FIG. 2 is a schematic left view of the electric vehicle charging gun of FIG. 1.
Figure 3:
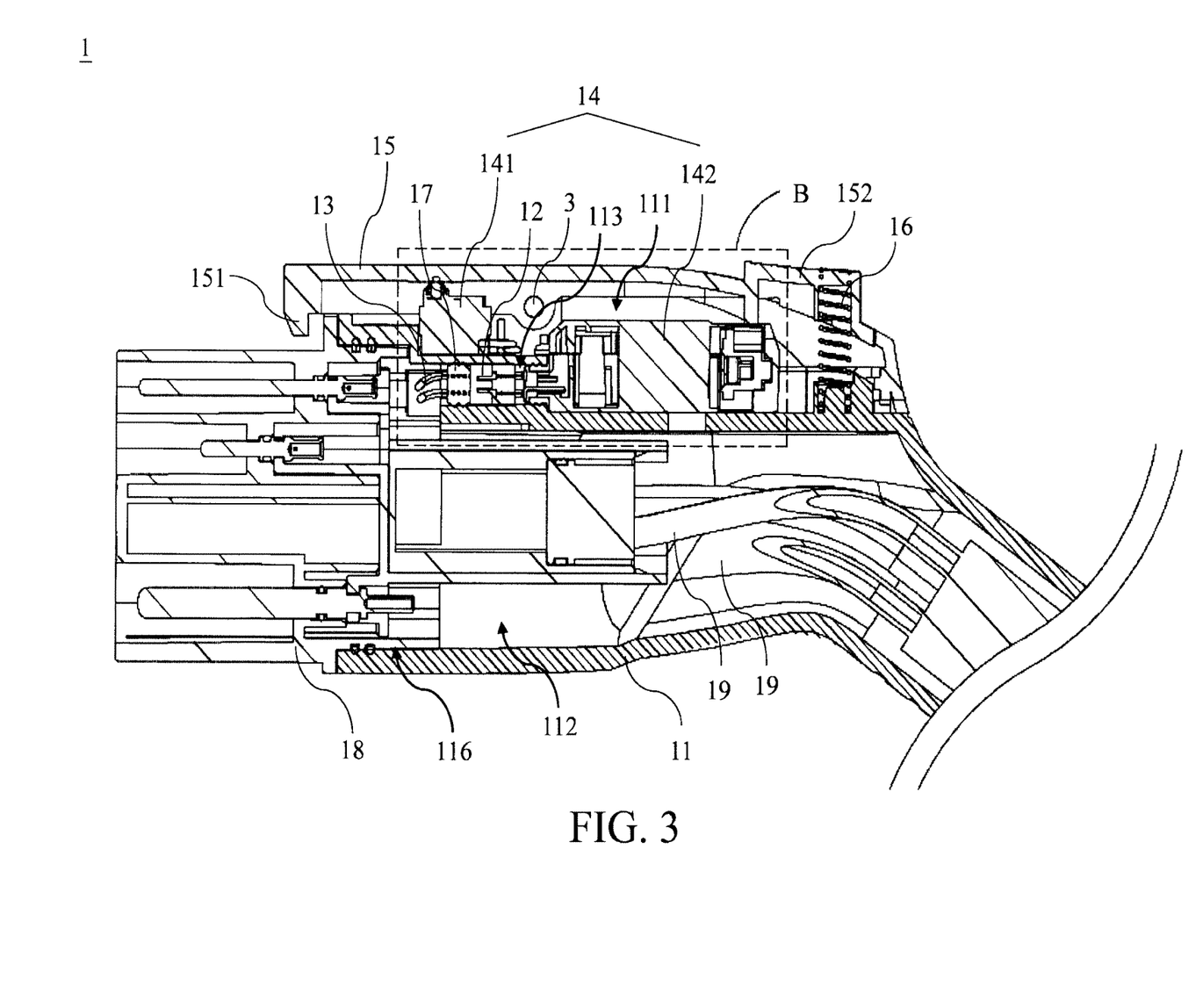
FIG. 3 is a sectional view of the electric vehicle charging gun taken along the line AA of FIG. 2.
Figure 4:
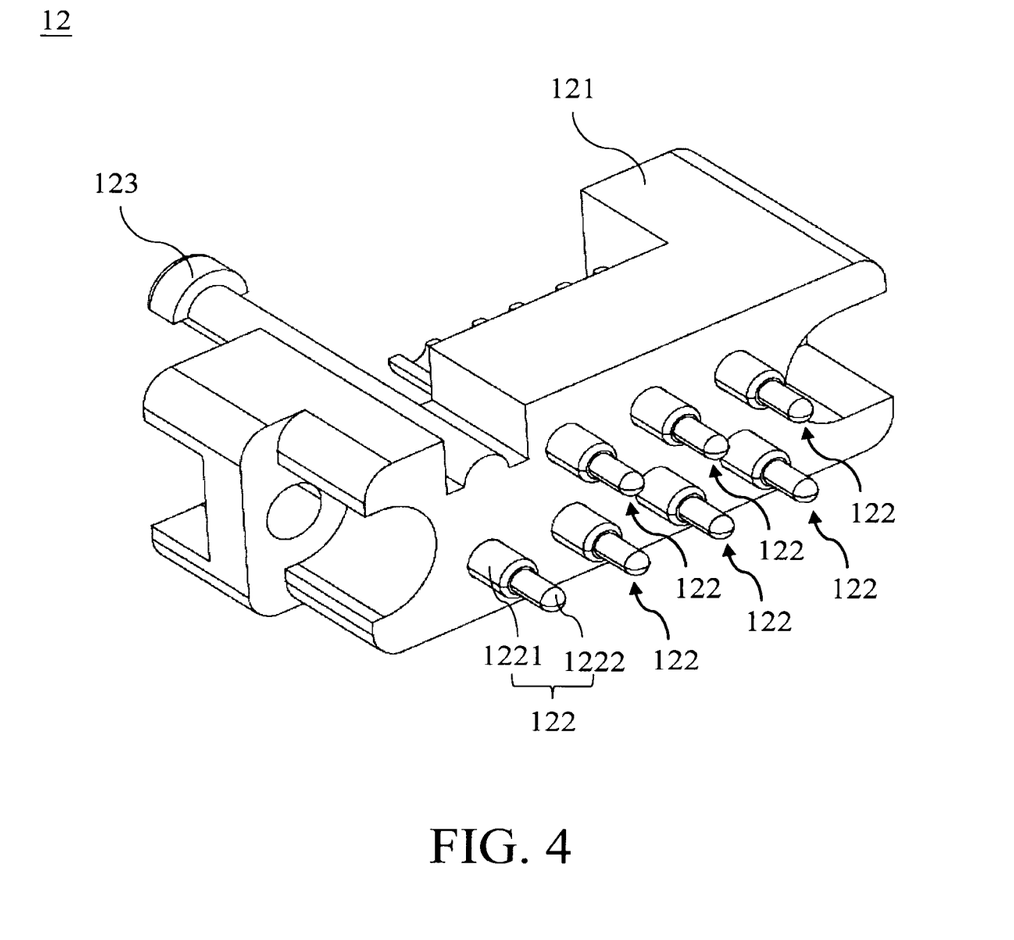
FIG. 4 is a three-dimensional structure schematic diagram of the elastic connector of FIG. 3.

Please refer to FIG. 1 to FIG. 3, wherein FIG. 1 is a schematic structural view of an electric vehicle charging gun according to an embodiment of the present disclosure, FIG. 2 is a schematic left view of the electric vehicle charging gun of FIG. 1, and FIG. 3 is a sectional view of the electric vehicle charging gun taken along the line AA of FIG. 2. As shown in FIG. 1 to FIG. 3, the electric vehicle charging gun 1 comprises a housing 11, an elastic connector 12, a plurality of first cables 13 and a locking module 14. The housing 11 is provided with a first cavity 111, a second cavity 112 and a first opening 113 communicating with the first cavity 111 and the second cavity 112. The elastic connector 12 is disposed in the first opening 113. The plurality of first cables 13 are disposed in the second cavity 112, one end of each first cable 13 is connected to the elastic connector 12, and the other end of each first cable 13 is connected to a power supply unit (not shown). The power supply unit may be but not limited to a charging pile. The elastic connector 12 may be but not limited to a pogo pin connector, and may comprise a base 121 and a plurality of spring terminals 122, the base 121 may be fixed in the first opening 113, the plurality of spring terminals 122 may be electrically connected to the locking module 14 and the plurality of first cables 13, the plurality of spring terminals 122 are connected to the plurality of first cables 13 in a one-to-one relationship (that is, the number of spring terminals 122 and the number of first cables 13 are equal), the number of spring terminals 122 may be but not limited to 7, as shown in FIG. 4, which is a three-dimensional structure schematic diagram of the elastic connector of FIG. 3, and the number of spring terminals 122 can be adjusted according to actual needs.

Figure 5:
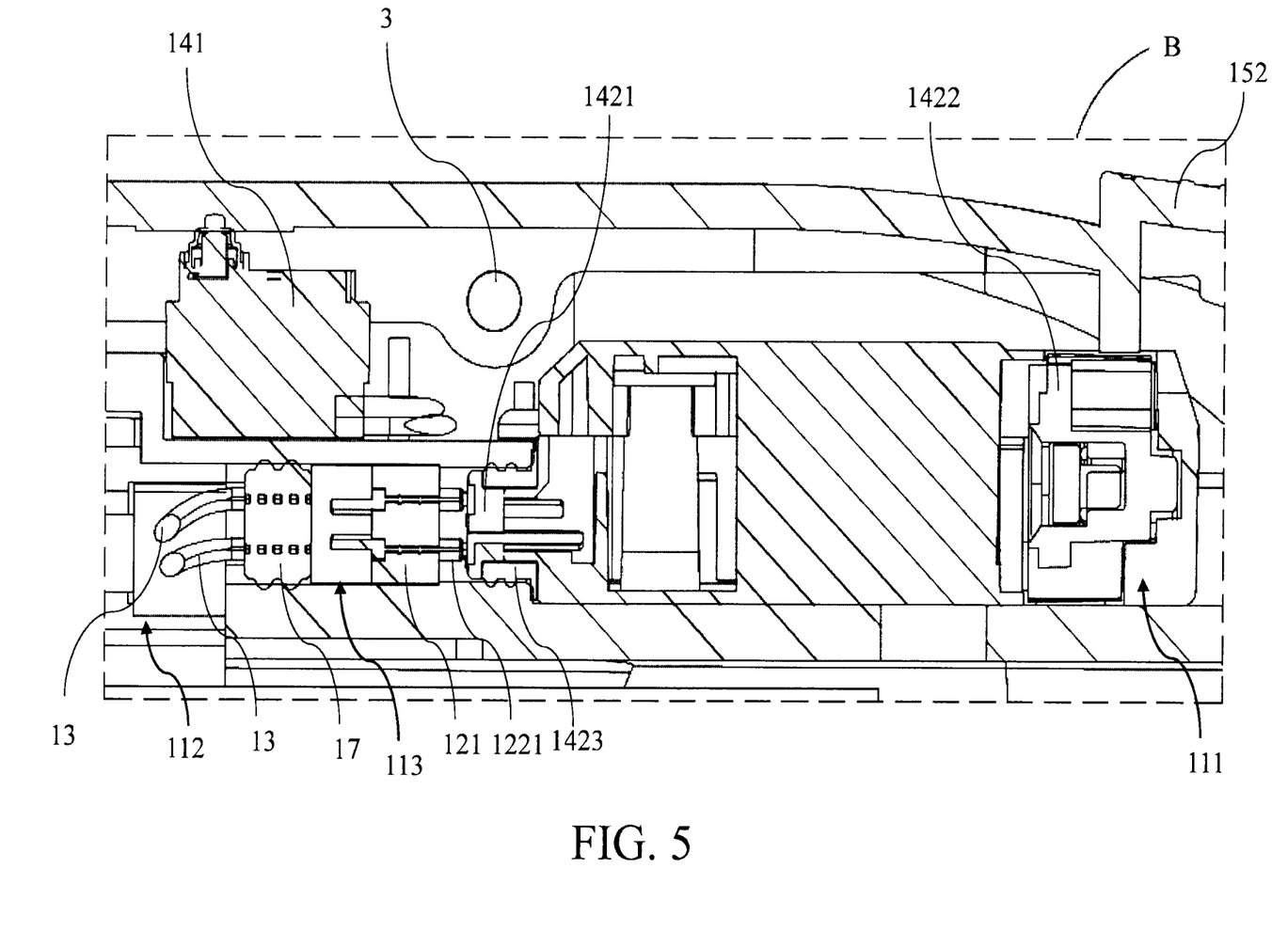
FIG. 5 is an enlarged schematic diagram of the area B of the electric vehicle charging gun of FIG. 3.
Figure 6:
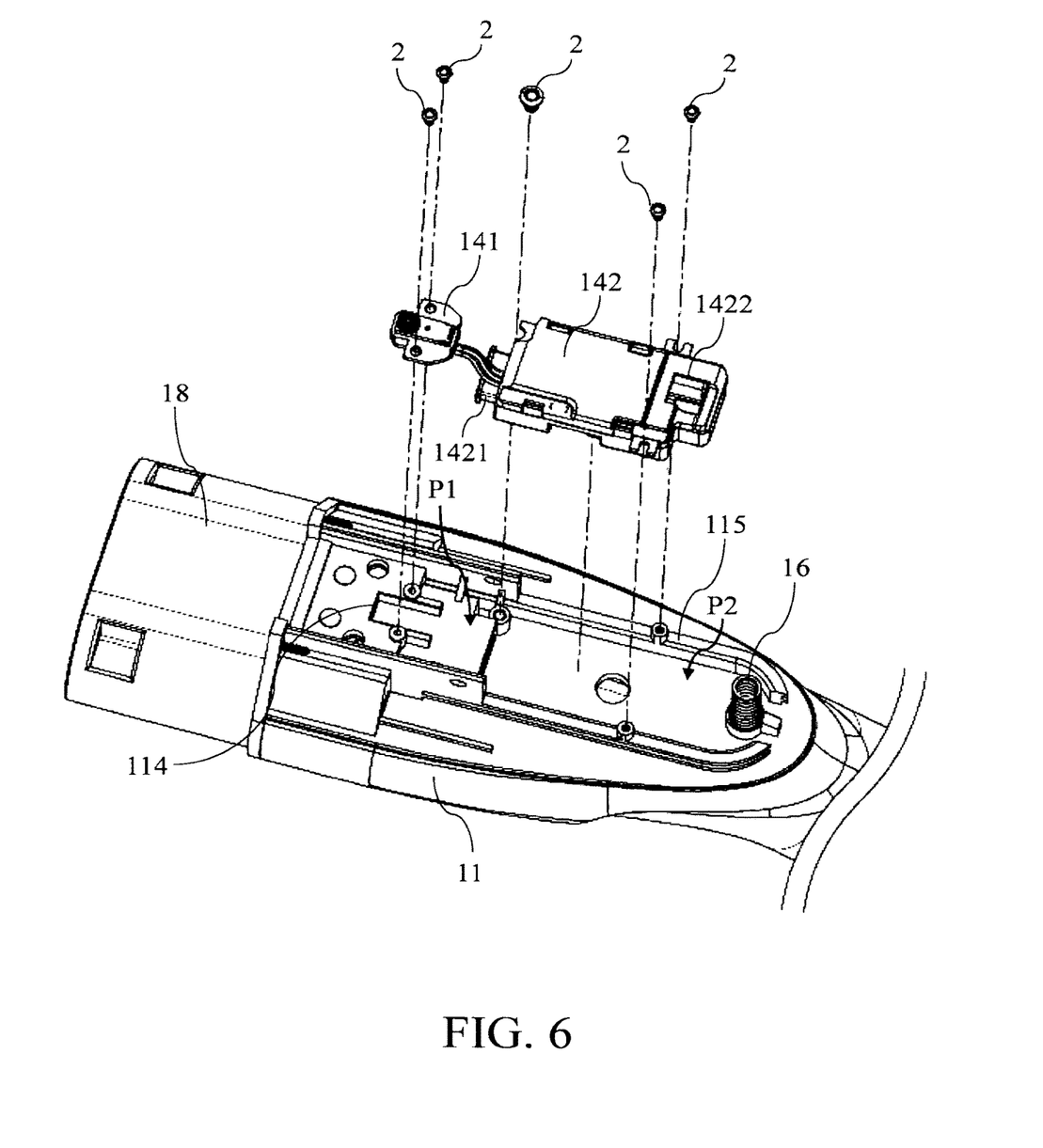
FIG. 6 is a partial exploded diagram of the electric vehicle charging gun of FIG. 1.

Please refer to FIG. 3, FIG. 5 and FIG. 6, wherein FIG. 5 is an enlarged schematic diagram of the area B of the electric vehicle charging gun of FIG. 3, and FIG. 6 is a partial exploded diagram of the electric vehicle charging gun of FIG. 1. As shown in FIG. 3, FIG. 5 and FIG. 6, the locking module 14 is disposed in the first cavity 111 and is detachably electrically connected to the elastic connector 12, and the locking module 14 comprises a control switch 141 and an electronic lock 142 electrically connected to each other, wherein the control switch 141 and the electronic lock 142 are integrated together; the control switch 141 is configured to control the electronic lock 142 to perform a locking action to lock the electric vehicle charging gun 1; and the electronic lock 142 transmits a feedback signal to the power supply unit through the elastic connector 12 and the plurality of first cables 13, receives an unlock signal from the power supply unit, and performs an unlocking action to unlock the electric vehicle charging gun 1 based on the unlock signal.

Specifically, after the electric vehicle charging gun 1 is plugged into an electric vehicle charging seat of the electric vehicle, the control switch 141 outputs a corresponding signal to the electronic lock 142, and the electronic lock 142 performs the locking action based on the signal sent by the control switch 141, so that the electric vehicle charging gun 1 locks the electric car charging seat. In addition, after performing the locking action, the electronic lock 142 transmits a feedback signal to the power supply unit through the elastic connector 12 and the plurality of first cables 13, so that the power supply unit starts to charge the electric vehicle through the plugged electric vehicle charging gun 1 and the electric vehicle charging seat. When the power supply unit detects that the charging is complete, it transmits an unlocking signal to the electronic lock 142 through the plurality of first cables 13 and the elastic connector 12, and the electronic lock 142 performs an unlocking action based on the unlocking signal, so that the electric vehicle charging gun 1 unlocks the electric vehicle charging seat; at this time, the user can separate the electric vehicle charging gun 1 from the electric vehicle charging seat.

Figure 7:
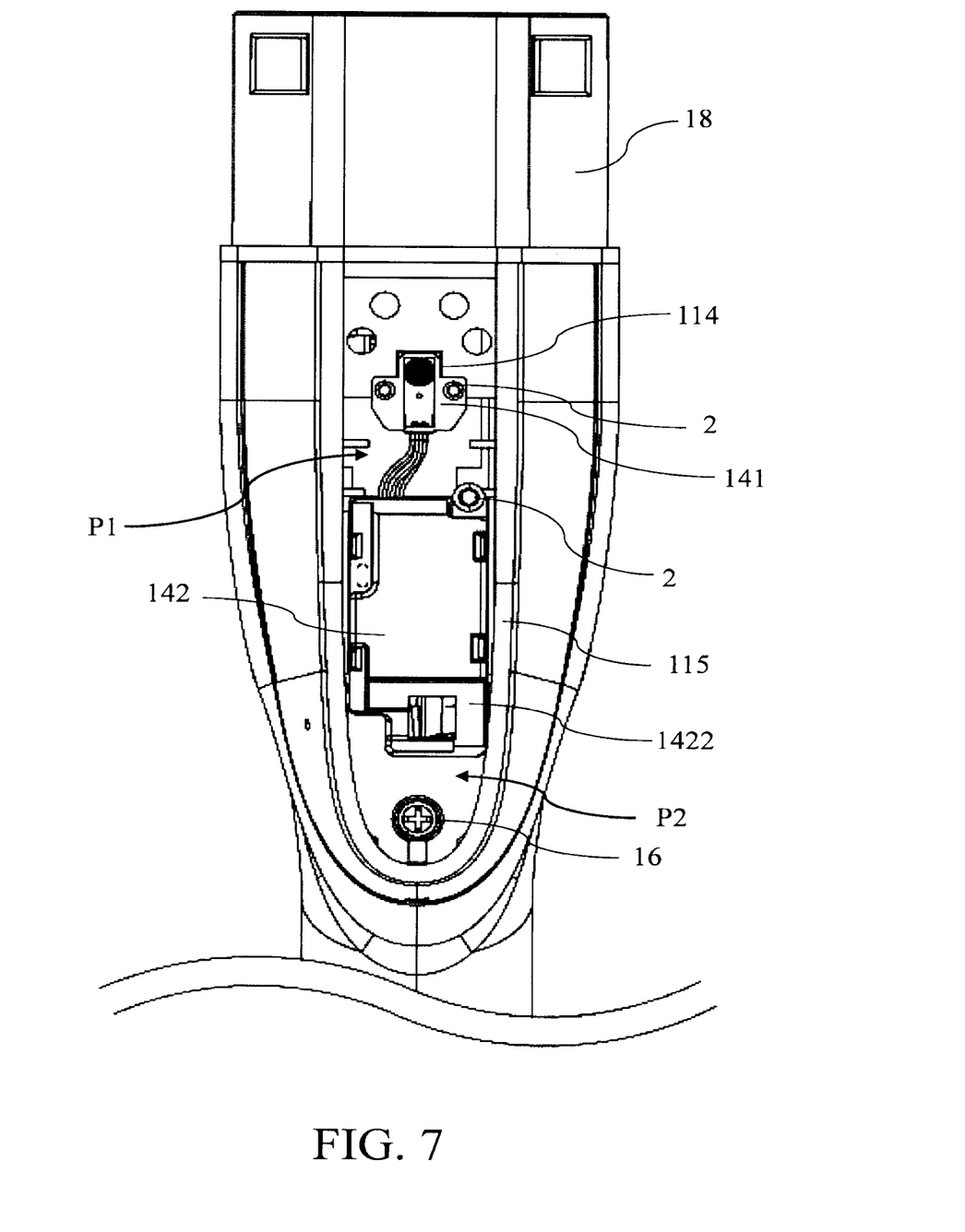
FIG. 7 is a top view of the electric vehicle charging gun of FIG. 1 without the mechanical lock.

Please refer to FIG. 6 and FIG. 7, wherein FIG. 7 is a top view of the electric vehicle charging gun of FIG. 1 without the mechanical lock. The housing 11 may further be provided with a first positioning frame 114 and a second positioning frame 115, the first positioning frame 114 and the second positioning frame 115 are disposed in the first cavity 111, the first positioning frame 114 may position the control switch 141, and the second positioning frame 115 may position the electronic lock 142.

In one embodiment, the first positioning frame 114 and the second positioning frame 115 are located on different planes, and a setting height of the first positioning frame 114 is higher than that of the second positioning frame 115. In other words, the control switch 141 may be disposed on the plane P1, the electronic lock 142 may be disposed on the plane P2, and a setting height of the plane P1 is higher than that of the plane P2.

In one embodiment, the control switch 141 and the electronic lock 142 are fixed on the housing 11 by screws 2 as shown in FIG. 6. The control switch 141 and the electronic lock 142 are detachably installed in the first cavity 111 at the top of the housing 11 by screws 2, which facilitates the installation and disassembly of the control switch 141 and the electronic lock 142.

Figure 8:
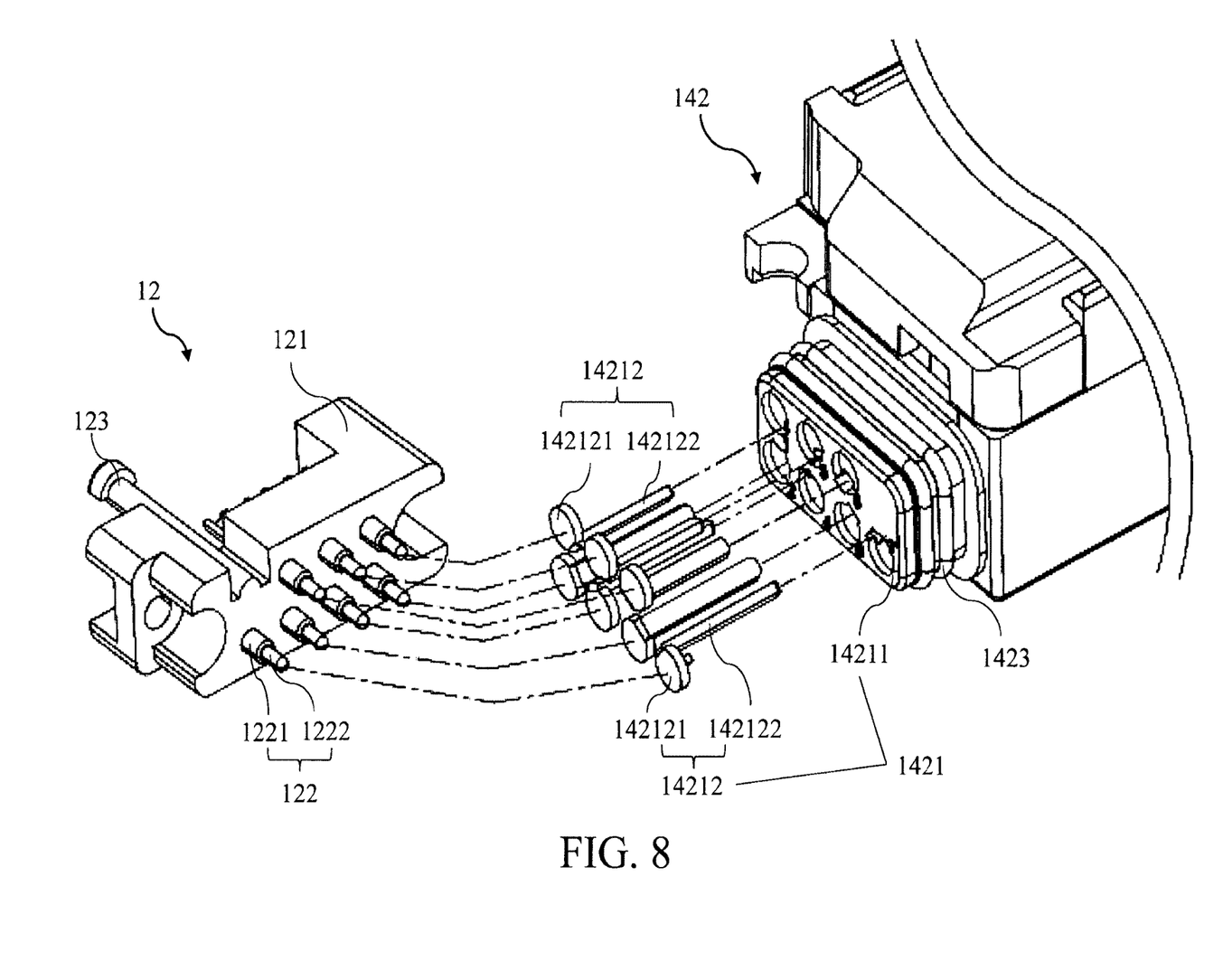
FIG. 8 is a schematic diagram of the corresponding connection between the elastic connector and the electronic lock of FIG. 5.

Please refer to FIG. 3, FIG. 5 and FIG. 8, wherein FIG. 8 is a schematic diagram of the corresponding connection between the elastic connector and the electronic lock of FIG. 5. The electronic lock 142 comprises a butting connector 1421. When the electronic lock 142 is disposed in the first cavity 111, the electronic lock 142 presses the plurality of spring terminals 122 of the elastic connector 12 through the plurality of conductive terminals 14212 of the butting connector 1421, so that the electronic lock 142 is electrically connected to the elastic connector 12. Therefore, by the design of the butting connector 1421 and the elastic connector 12, when the control switch 141 and the electronic lock 142 are replaced due to abnormality of the control switch 141 and/or the electronic lock 142, the electronic lock 142 and the elastic connector 12 may be rapidly contacted.

In one embodiment, the butting connector 1421 may comprise an insulating body 14211 and the plurality of conductive terminals 14212, and each conductive terminal 14212 may comprise a contact portion 142121 exposed on the surface of the insulating body 14211 butted against the elastic connector 12 and a pin portion 142122 accommodated in the insulating body 14211. When the electronic lock 142 is disposed in the first cavity 111, each contact portion 142121 presses the spring terminal 122 of the elastic connector 12 corresponding thereto.

In one embodiment, each spring terminal 122 may comprise a holding portion 1221 fixed on the base 121 and a telescopic portion 1222 exposed outside the base 121 as shown in FIG. 4. When the electronic lock 142 is disposed in the first cavity 111, each telescopic portion 1222 is pressed by the conductive terminal 14212 corresponding thereto to retract toward the base 121.

In one embodiment, the electronic lock 142 may further comprise a waterproof ring 1423, and the waterproof ring 1423 is sleeved on the outside of the butting connector 1421. When the electronic lock 142 is disposed in the first cavity 111, the butting connector 1421 is plugged into the first opening 113, the waterproof ring 1423 abuts against the sidewall of the first opening 113 to achieve a waterproof effect.

In one embodiment, referring to FIG. 3, the electric vehicle charging gun 1 may further comprise a mechanical lock 15, which is rotatably connected to the housing 11 through a rotating shaft 3, and covers the first cavity 111. One end of the mechanical lock 15 is provided with a hook 151 for locking the electric vehicle charging seat, and the other end of the mechanical lock 15 is provided with a pressing piece 152. After the electric vehicle charging gun 1 is plugged into the electric vehicle charging seat, the control switch 14 is triggered to control the electronic lock 142 to perform the locking action to lock the mechanical lock 15, so that the hook 151 is engaged with the electric vehicle charging seat. The electronic lock 142 performs the unlocking action after receiving the unlock signal to unlock the mechanical lock 15, so that the hook 151 is disengaged from the electric vehicle charging seat after the pressing piece 152 is pressed. Specifically, the control switch 141 is located on the side close to the hook 151 at the connection between the mechanical lock 15 and the rotating shaft 3; when the electric vehicle charging gun 1 is plugged into the electric vehicle charging seat, the mechanical lock 15 rotates relative to the housing 11 to trigger the control switch 141, the control switch 141 controls the electronic lock 142 to perform the locking action to lock the mechanical lock 15 (that is, the mechanical lock 15 cannot rotate relative to the housing 11), so that the hook 151 is engaged with the electric vehicle charging seat; after the electronic lock 142 receives the unlocking signal, it performs the unlocking action to unlock the mechanical lock 15, so that after the user presses the pressing piece 152, the mechanical lock 15 can rotate relative to the housing 11, and the hook 151 is disengaged from the electric vehicle charging seat, and then the user can separate the electric vehicle charging gun 1 from the electric vehicle charging seat.

In one embodiment, the electronic lock 142 may comprise a locking mechanism 1422 as shown in FIG. 3, FIG. 6 and FIG. 7. The electronic lock 142 locks or unlocks the mechanical lock 15 through the locking mechanism 1422. Specifically, when the electronic lock 142 performs the locking action, the locking mechanism 1422 may be moved to a locking position, so that the pressing piece 152 cannot be pressed down (that is, the mechanical lock 15 is in a locked state); when the electronic lock 142 performs the unlocking action, the locking mechanism 1422 can be moved to an unlocked position, so that the pressing piece 152 can be pressed down (that is, the mechanical lock 15 is in an unlocked state).

In one embodiment, the electric vehicle charging gun 1 may further comprise an elastic reset piece 16 as shown in FIG. 3. The elastic reset piece 16 is disposed between the housing 11 and the pressing piece 152, and is configured to make the pressed pressing piece 152 reset, wherein the elastic reset piece 16 may be but not limited to a spring.

In one embodiment, the electric vehicle charging gun 1 may further comprise a waterproof rubber plug 17 disposed in the first opening 113 as shown in FIG. 3 and FIG. 5. The waterproof rubber plug 17 is disposed on a side of the elastic connector 12 opposite to the electronic lock 142, and allows the plurality of first cables 13 to pass through. Therefore, the waterproof effect can be achieved.

In one embodiment, the elastic connector 12 may further comprise a positioning column 123 disposed on the side of the base 121 opposite to the plurality of spring terminals 122. The positioning column 123 may be configured to pass through the waterproof rubber plug 17 and position the waterproof rubber plug 17 as shown in FIG. 4 and FIG. 5.

In one embodiment, the housing 11 may be further provided with a second opening 116 connecting the external environment and the second cavity 112. The electric vehicle charging gun 1 may further comprise a charging plug 18 and a plurality of second cables 19, the charging plug 18 is disposed in the second opening 116, and the plurality of second cables 19 are disposed in the second cavity 112. One end of each second cable 19 is connected to the charging plug 18, and the other end of each second cable 19 is connected to the power supply unit as shown in FIG. 3. The electric vehicle charging gun 1 may be a direct current (DC) charging gun, and the charging plug 18 may comprise two DC power supply terminals 181 and 182, two charging communication terminals 183 and 184, two charging connection confirmation terminals 185 and 186, two low-voltage auxiliary power supply terminals 187 and 188 and one protective grounding terminal 189 as shown in FIG. 2.

In summary, in the electric vehicle charging gun of the present disclosure, by the design that the elastic connector is disposed in the first opening, the control switch and the electronic lock are integrated into the locking module, the locking module is disposed in the first cavity on the top of the housing, and the locking module is detachably electrically connected to the elastic connector, the assembly process is reduced, and the electronic lock and the elastic connector are rapidly contacted; the electronic lock and the control switch can be replaced quickly, the maintenance cost is reduced and the maintenance efficiency is improved when the electronic lock and/or control switch are/is abnormal.

While the present disclosure is disclosed in the foregoing embodiments, it should be noted that these descriptions are not intended to limit the present disclosure. On the contrary, the present disclosure covers modifications and equivalent arrangements obvious to those skilled in the art. Therefore, the scope of the claims must be interpreted in the broadest manner to comprise all obvious modifications and equivalent arrangements.

What is claimed is:

1. An electric vehicle charging gun, comprising:
   a housing, provided with a first cavity, a second cavity and a first opening connecting the first cavity and the second cavity;
   an elastic connector, disposed in the first opening;
   a plurality of first cables, disposed in the second cavity, one end of each first cable being connected to the elastic connector, and the other end of each first cable being connected to a power supply unit; and
   a locking module, disposed in the first cavity and detachably electrically connected to the elastic connector, wherein the locking module comprises a control switch and an electronic lock electrically connected to each other, the control switch and the electronic lock are integrated together, the control switch is configured to control the electronic lock to perform a locking action to lock the electric vehicle charging gun, the electronic lock transmits a feedback signal to the power supply unit through the plurality of first cable and the elastic connector, and receives an unlock signal from the power supply unit, and performs an unlock action to unlock the electric vehicle charging gun based on the unlock signal.

2. The electric vehicle charging gun according to claim 1, wherein the housing is further provided with a first positioning frame and a second positioning frame, the first positioning frame and the second positioning frame are disposed in the first cavity, the first positioning frame positions the control switch, and the second positioning frame positions the electronic lock.

3. The electric vehicle charging gun according to claim 2, wherein the first positioning frame and the second positioning frame are located on different planes, and a setting height of the first positioning frame is higher than that of the second positioning frame.

4. The electric vehicle charging gun according to claim 1, wherein the control switch and the electronic lock are fixed on the housing by screws.

5. The electric vehicle charging gun according to claim 1, wherein the electronic lock comprises a butting connector; when the electronic lock is disposed in the first cavity, the electronic lock presses a plurality of spring terminals of the elastic connector through a plurality of conductive terminals of the butting connector, so that the electronic lock is electrically connected to the elastic connector.

6. The electric vehicle charging gun according to claim 5, wherein the butting connector comprises an insulating body and the plurality of conductive terminals, each of the plurality of conductive terminals comprises a contact portion exposed on a surface of the insulating body butted against the elastic connector and a pin portion accommodated in the insulating body; when the electronic lock is disposed in the first cavity, each contact portion presses a spring terminal of the elastic connector corresponding thereto.

7. The electric vehicle charging gun according to claim 5, wherein the elastic connector comprises a base and the plurality of spring terminals, each of the plurality of spring terminals comprises a holding portion fixed on the base and a telescopic portion exposed outside of the base; when the electronic lock is disposed in the first cavity, each telescopic portion is pressed by a conductive terminal of the butting connector corresponding thereto to retract toward the base.

8. The electric vehicle charging gun according to claim 1, further comprising a mechanical lock, wherein the mechanical lock is rotatably connected to the housing through a rotating shaft and covers the first cavity; one end of the mechanical lock is provided with a hook for locking an electric vehicle charging seat, the other end of the mechanical lock is provided with a pressing piece; after the electric vehicle charging gun is plugged into the electric vehicle charging seat, the control switch is triggered to control the electronic lock to perform the locking action to lock the mechanical lock, so that the hook is engaged with the electric vehicle charging seat; and the electronic lock performs the unlocking action after receiving the unlock signal, so as to unlock the mechanical lock, so that the hook is disengaged from the electric vehicle charging seat after the pressing piece is pressed.

9. The electric vehicle charging gun according to claim 8, wherein the electronic lock comprises a locking mechanism, and the electronic lock locks or unlocks the mechanical lock through the locking mechanism.

10. The electric vehicle charging gun according to claim 1, further comprising a waterproof rubber plug disposed in the first opening, wherein the waterproof rubber plug is disposed on a side of the elastic connector opposite to the electronic lock, and allows the plurality of first cables to pass through.

* * * * *